No. 736,214. PATENTED AUG. 11, 1903.
F. B. CASE.
LATERALLY ADJUSTABLE LENS CARRIAGE.
APPLICATION FILED APR. 15, 1903.
NO MODEL.
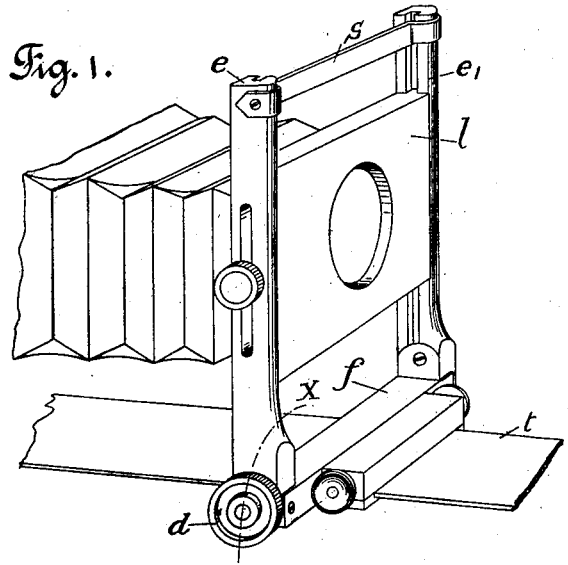
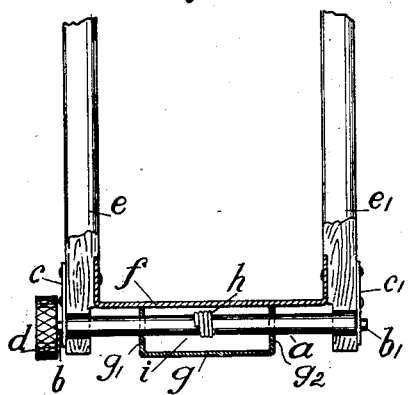
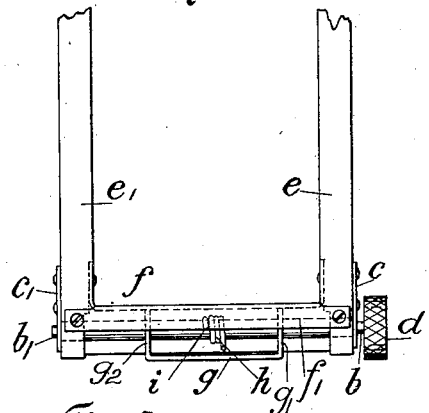
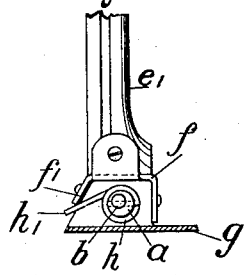
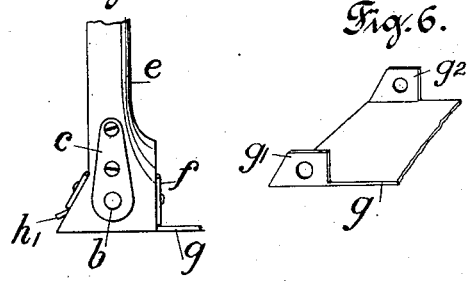
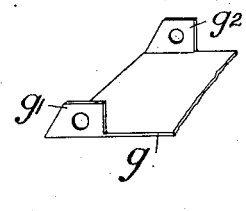
Witnesses:
Fred P. Maushundel.
A. Pearl Moore.
Inventor
Frank B. Case.
By Atty. Wm. H. Cooley.

No. 736,214. Patented August 11, 1903.

UNITED STATES PATENT OFFICE.

FRANK B. CASE, OF ROCHESTER, NEW YORK.

LATERALLY-ADJUSTABLE LENS-CARRIAGE.

SPECIFICATION forming part of Letters Patent No. 736,214, dated August 11, 1903.

Application filed April 15, 1903. Serial No. 152,678. (No model.)

*To all whom it may concern:*

Be it known that I, FRANK B. CASE, a citizen of the United States, and a resident of Rochester, in the county of Monroe and State of New York, have invented a new and Improved Laterally-Adjustable Lens-Carriage, of which the following is a specification.

The object of my invention is to provide an economical and efficient lateral adjustment for the lens-carriage of a camera whereby such lens-carriage may be readily adjusted and secured at any desired point within a suitable range laterally relative to the bed-plate of the camera.

With this object in view my invention consists in the conformation, coöperation, and arrangement of parts shown in the accompanying drawings, in which—

Figure 1 is a perspective view of only such parts of a lens-carriage as are necessary to show the assembled mechanism made use of in my invention. Fig. 2 is a sectional view of my mechanism, taken along the dotted line $xy$ of Fig. 1 and through the axis of rod $a$ and with such rod $a$ and the milled operating-head $d$ shown in full. Fig. 3 is a view of the complete mechanism as seen from the back. Fig. 4 is a side view of the lower part of the lens-carriage with standard $e$, milled head $d$, and the wings of the slide $g$ nearer to the observer removed. Fig. 5 is a side view of the lower parts of the lens-carriage with milled head $d$ removed. Fig. 6 is a perspective view of the slide $g$.

Similar letters refer to similar parts throughout the several views.

As seen in Fig. 1, the two standards $e$ and $e'$ are secured together at the top by means of yoke $s$ and at the lower end by means of a specially-shaped base-plate $f$, screwed to each of such standards on three sides thereof. Vertically adjustable between the standards $e$ and $e'$ there is secured in the well-known way the lens-board $l$.

As seen in Figs. 2, 3, and 4, a shaft or rod $a$ is eccentrically journaled in the bearings $c$ and $c'$, secured on the outside of the lower end of the standards $e$ and $e'$, respectively. One end of the rod $a$ carries a milled head $d$ by which it can be turned. Wound around shaft $a$ in such a way as to oppose the direction of motion given to milled head $d$ is seen a spring $h$, one end of which is secured in a hole $i$, drilled in the rod $a$, while the other end $h'$ rests against the side $f'$ of base-plate $f$. This rod $a$ is arranged to slide horizontally through suitable holes therefor seen in the two wings of a slide $g$. This slide $g$ is secured to the usual guide-blocks, sliding and adjustably secured at any desired point longitudinally on the usual bed-plate, all as indicated in outline in Fig. 1. Such features forming no part of my present invention are only briefly referred to herein.

The spring $h$ by reason of its connections already described transmits to the rod $a$ a tendency to turn in such a direction as to clamp the slide $g$ against the under side of the base-plate $f$. The different parts, as rod $a$, spring $h$, and slide $g$, are so adjusted that spring $h$ normally locks the two wings $g'$ and $g^2$ of slide $g$ securely against the under surface of the base-plate $f$.

It is obvious that by turning milled head $d$ the slide $g$ will be unlocked, leaving the lens-carriage free to be moved to the right or to the left, while such slide $g$ is retained in its desired longitudinal adjustment. By releasing milled head $d$ the carriage is rigidly locked to the slide $g$ and therefore to the bed-plate $t$.

What I claim is—

1. Two camera elements arranged to slide one upon the other, coöperating guiding mechanisms carried by such elements, a rod, slidable through and rotatable in suitable openings therefor in one and eccentrically journaled in the other of such elements, a handle for turning such rod to clamp such elements together in any desired position of relative adjustment.

2. Two camera elements arranged to slide one upon the other, coöperating guiding mechanisms carried by such elements, a rod, slidable through and rotatable in suitable openings therefor in one and eccentrically journaled in the other of such elements, a handle on such rod, and a spring operating to turn such rod to clamp such elements together in any desired position of relative adjustment.

3. Two camera elements, sliding one upon the other, coöperating guiding mechanisms carried by such elements comprising a rod, carried by one of such elements, and a member carried by the other arranged to slide upon such rod, eccentric connections between such rod and one of such elements operable to clamp such elements together in any desired position of relative adjustment.

FRANK B. CASE.

Witnesses:
 FRED P. MANSBENDT,
 A. PEARL MOORE.